(12) United States Patent
Schott et al.

(10) Patent No.: US 6,227,059 B1
(45) Date of Patent: May 8, 2001

(54) SYSTEM AND METHOD FOR EMPLOYING AN IMAGINARY DIFFERENCE SIGNAL COMPONENT TO COMPENSATE FOR BOUNDARY CONDITION EFFECTS ON A CORIOLIS MASS FLOW METER

(75) Inventors: Michael N. Schott, Loveland; Donald R. Cage, Longmont; Larry K. Carmichael, Platteville, all of CO (US)

(73) Assignee: Direct Measurement Corporation, Longmont, CO (US)

( * ) Notice: Subject to any disclaimer, the term of this patent is extended or adjusted under 35 U.S.C. 154(b) by 0 days.

(21) Appl. No.: 09/229,452

(22) Filed: Jan. 12, 1999

(51) Int. Cl.$^7$ ........................................................ G01F 1/84

(52) U.S. Cl. ............................................................ 73/861.356

(58) Field of Search ........................... 73/861.355, 861.356, 73/861.357

(56) References Cited

U.S. PATENT DOCUMENTS

| | | | |
|---|---|---|---|
| Re. 31,450 | 11/1983 | Smith | 73/861.38 |
| 3,444,723 | 5/1969 | Wakefield | 73/32 |
| 3,485,098 | 12/1969 | Sipin | 73/194 |
| 3,874,221 | 4/1975 | Lockie | 73/30 |
| 3,927,565 | 12/1975 | Pavlin et al. | 73/194 |
| 4,009,616 | 3/1977 | Wonn | 73/398 R |
| 4,109,524 | 8/1978 | Smith | 73/194 |
| 4,217,774 | 8/1980 | Agar | 73/32 |
| 4,420,983 | 12/1983 | Langdon | 73/861.18 |
| 4,422,338 | 12/1983 | Smith | 73/861.38 |
| 4,490,009 | 12/1984 | Nakai et al. | 350/96.23 |
| 4,491,025 | 1/1985 | Smith et al. | 73/861.38 |
| 4,574,639 | 3/1986 | Ward | 73/702 |
| 4,622,858 | 11/1986 | Mizerak | 73/861.38 |
| 4,628,744 | 12/1986 | Lew | 73/861.38 |
| 4,653,332 | 3/1987 | Simonsen | 73/861.38 |
| 4,680,974 | 7/1987 | Simonsen et al. | 73/861.38 |
| 4,691,578 | 9/1987 | Herzl | 73/861.38 |
| 4,711,132 | 12/1987 | Dahlin | 73/861.38 |
| 4,716,771 | 1/1988 | Kane | 73/861.38 |
| 4,729,243 | 3/1988 | Friedland et al. | 73/861.38 |
| 4,733,569 | 3/1988 | Kelsey et al. | 73/861.38 |
| 4,756,197 | 7/1988 | Herzl | 73/861.38 |
| 4,756,198 | 7/1988 | Levien | 73/861.38 |

(List continued on next page.)

FOREIGN PATENT DOCUMENTS

| | | | |
|---|---|---|---|
| 3 0 109 218 A2 | 5/1984 | (EP) | G01F/1/80 |
| 4 0 119 638 A1 | 9/1984 | (EP) | G01F/1/80 |
| WO 85/05677 | 12/1985 | (EP) | G01F/1/84 |
| 0 210 308 A1 | 2/1987 | (EP) | G01F/1/78 |
| WO 87/06691 | 11/1987 | (EP) | G01F/1/84 |
| 0 272 758 | 6/1988 | (EP) | G01F/1/84 |
| WO 89/00679 | 1/1989 | (EP) | G01F/1/84 |
| 0 375 300 A2 | 6/1990 | (EP) | G01F/1/84 |
| 0 379 799 A1 | 8/1990 | (EP) | G01F/1/78 |
| WO 92/14123 | 8/1992 | (EP) | G01F/1/84 |
| WO 93/01472 | 1/1993 | (EP) | G01F/1/84 |
| WO 96/05484 | 2/1996 | (EP) | G01F/1/84 |
| 0 701 107 A2 | 3/1996 | (EP) | G01F/1/00 |
| 0 702 212 A2 | 3/1996 | (EP) . | |
| 2 171 200 | 8/1986 | (GB) | G01F/1/84 |
| 1008-617 | 2/1980 | (SD) | G01F/1/78 |

Primary Examiner—Harshad Patel

(57) ABSTRACT

A system for, and method of, compensating for a boundary condition effect on a Coriolis meter having (at least) two sensors for generating preliminary signals that are a function of fluid flow through the meter and a Coriolis meter employing the system or the method. In one embodiment, the system includes: (1) signal combination circuitry, couplable to the (at least) two sensors, that develops an imaginary difference signal based on the preliminary signals and (2) boundary effect compensation circuitry, coupled to the signal combination circuitry, that calculates a boundary effect compensation factor based on the imaginary difference signal.

19 Claims, 4 Drawing Sheets

U.S. PATENT DOCUMENTS

| | | | |
|---|---|---|---|
| 4,768,384 | 9/1988 | Flecken et al. | 73/861.02 |
| 4,776,220 | 10/1988 | Lew | 73/861.38 |
| 4,793,191 | 12/1988 | Flecken et al. | 73/861.38 |
| 4,798,091 | 1/1989 | Lew | 73/861.38 |
| 4,803,867 | 2/1989 | Dahlin | 73/32 |
| 4,811,606 | 3/1989 | Hasegawa et al. | 73/861.38 |
| 4,813,289 | 3/1989 | Lew | 73/861.38 |
| 4,823,614 | 4/1989 | Dahlin | 73/861.38 |
| 4,829,832 | 5/1989 | Lew | 73/861.38 |
| 4,831,885 | 5/1989 | Dahlin | 73/861.38 |
| 4,852,410 | 8/1989 | Corwon et al. | 73/861.38 |
| 4,856,346 | 8/1989 | Kane | 73/861.38 |
| 4,869,097 | 9/1989 | Tittmann et al. | 73/52 |
| 4,879,910 | 11/1989 | Lew | 73/861.37 |
| 4,882,935 | 11/1989 | Lew | 73/861.38 |
| 4,891,991 | 1/1990 | Mattar et al. | 73/861.38 |
| 4,934,195 | 6/1990 | Hussain | 73/861.38 |
| 4,934,196 | 6/1990 | Romano | 73/861.38 |
| 4,949,583 | 8/1990 | Lang et al. | 73/861.37 |
| 4,955,239 | 9/1990 | Cage | 73/861.38 |
| 4,996,871 | 3/1991 | Romano . | |
| 5,024,104 | 6/1991 | Dames | 73/861.37 |
| 5,027,662 | 7/1991 | Titlow et al. | 73/861.38 |
| 5,040,415 | 8/1991 | Barkhoudarian | 73/198 |
| 5,044,207 | 9/1991 | Atkinson et al. | 73/861.37 |
| 5,069,075 | 12/1991 | Hansen et al. | 73/861.38 |
| 5,226,330 | 7/1993 | Lew | 73/861.37 |
| 5,230,254 | 7/1993 | Craft | 73/861.38 |
| 5,373,745 | 12/1994 | Cage | 73/861.37 |
| 5,381,697 | 1/1995 | Van der Pol | 73/861.37 |
| 5,473,949 | 12/1995 | Cage | 73/861.38 |
| 5,497,665 | 3/1996 | Cage | 73/861.38 |
| 5,753,827 | 5/1998 | Cage | 73/861.356 |
| 5,827,979 | 10/1998 | Schott | 73/861.357 |

SYSTEM AND METHOD FOR EMPLOYING AN IMAGINARY DIFFERENCE SIGNAL COMPONENT TO COMPENSATE FOR BOUNDARY CONDITION EFFECTS ON A CORIOLIS MASS FLOW METER

CROSS-REFERENCE TO RELATED APPLICATIONS

The present invention is related to that disclosed in Ser. No. 08/233,687, filed on Apr. 26, 1994, and entitled "Coriolis Mass Flow Rate Meter Having Adjustable Pressure and Density Sensitivity;" that disclosed in Ser. No. 08/569,967, filed on Dec. 8, 1995, and entitled "Signal Processing and Field Proving Methods and Circuits for a Coriolis Mass Flow Meter;" that disclosed in Ser. No. 08/544,268, filed on Oct. 17, 1996, and entitled "Coriolis Meter Having Adjustable Pressure and Density Sensitivity" and that disclosed in Ser. No. 08/636,034 filed on Apr. 22, 1996 and entitled "Signal Processing Apparati and Methods for Attenuating Shifts in Zero Intercept Attributable to a Changing Boundary Condition in a Coriolis Mass Flow Meter." All of the above inventions are commonly assigned with the present invention and incorporated herein by reference.

TECHNICAL FIELD OF THE INVENTION

The present invention is directed, in general, to Coriolis mass flow meters and, more specifically, to a system and method for compensating for boundary condition effects on a Coriolis mass flow meter based on an imaginary difference signal component and a Coriolis mass flow meter incorporating the system or the method.

BACKGROUND OF THE INVENTION

In the field of flow meters, Coriolis flow meters are unique in that they can directly measure the mass flow rate of a fluid with little or no intrusion into the fluid stream. Because of this, they have become increasingly popular and currently account for the fastest growing segment of the overall flow meter market.

Over the last 15 years, there has been a rapid evolution of developments in the field of Coriolis flow meters. These developments have concentrated on improving performance by optimizing flow conduit shapes and introducing improved signal processing techniques and different modes of vibration.

This evolutionary process began with the introduction of the first commercially-viable Coriolis mass flow meter using a U-shaped flow conduit vibrated in its first bending mode of vibration. The signal processing scheme employed was a time delay measurement between inlet and outlet motion signals. This method could give useful results, however, it was understood at that time that the elastic modulus of the vibrating portion of the flow conduit was itself a function of temperature, and that any changes therein change the sensitivity of the device. The temperature of the flow conduit had to be measured; then, the effect of temperature upon the elastic modulus of the flow conduit had to be characterized and a compensation value added to the flow signal to minimize the effects of changes in the elastic modulus of the flow conduit.

For example, 316L stainless steel is commonly used for the flow conduit material in these devices, yielding a theoretical tensile elastic modulus vs. temperature relationship of about −2.2% per 100° F. increase (in the range between 0° F. and 350° F.) and nearly linear for that material. Therefore, the compensation value is commonly applied in a linear relationship to account for the effects of temperature on tensile elastic modulus. It should be noted here that some meter designs depend upon the shear modulus rather than the tensile modulus, or a combination thereof, and a corresponding compensation value exists thereto.

While the prior art compensation method was simple, it was also known that 316L elastic modulus became increasingly non-linear as the temperature became colder or hotter, and in general, for most common conduit materials, the elastic modulus versus temperature curves are non-linear. This fact therefore necessitated adding more complex temperature compensation methods to account for a wider range of materials and non-linear temperature relationships.

As more Coriolis flow meters of different designs were put into service, it was found that not only temperature, but fluid density and pressure could also effect the sensitivity of the device. This realization prompted the same type of response from manufacturers as did the temperature problem earlier described in that the effects were required to be characterized and compensated for.

In the case of density effects, many types of Coriolis flow meters can calculate the density by virtue of the natural frequency of the conduit thereby yielding a signal proportional to density that can be used to compensate for density effects on sensitivity.

In the case of pressure effects, it was found that by restricting the conduit geometry to certain design relationships, pressure effects could be minimized. In either case however, the result was either more compensation circuit complexity or geometric design restrictions.

Flow meters with straight flow conduits were later introduced into the market. These meters are subject to temperature gradients between the flow conduit and the surrounding support structure that cause stresses in the flow conduit that can alter the sensitivity and zero of the device. Several methods were therefore introduced to accommodate this added problem, such as measuring the difference in temperature between the flow conduit and its support and calculating what the stress should be and deriving a compensation value based on that difference. Methods employing strain gages have also been employed for the purpose of determining the stress level and deriving the requisite compensation value, again adding more complexity to the circuit and necessitating greater understanding of the complex relationships between stress and the change in the sensitivity of a given device.

While the prior discussion has dealt primarily with effects on the sensitivity of a flow meter, another important flow measurement parameter is the zero. Since Coriolis flow meters are highly linear devices (or are made to have linear outputs) relative to mass flow rate, the two most important mathematical factors allowing their use as flow measurement devices are therefore (a) the slope of the output signal versus the mass flow rate therein (here defined as the "sensitivity" or "K-factor"), and (b) the value of the output signal at the intercept of the line with a zero mass flow point (herein defined as the "zero").

The zero has been a much more elusive parameter for manufacturers to control because zero shifts are not usually caused by predictable changes in material constants, etc., but can be caused by a number of subtle and interrelated problems in both the mechanics of the flow conduit, and in the electronics, both by design or by imperfections therein. These zero shifts are normally encountered along with changes in fluid or ambient conditions on the device similar to those just described for sensitivity effects, e.g., changes in temperature, pressure, density, frequency, viscosity or conduit stress.

To summarize the history, as Coriolis flow meter manufacturers have discovered effects on their devices that cause errors or changes in the sensitivity of their devices, they have generally chosen to characterize, measure and compensate for each effect individually, thereby creating complex compensation methods that are more expensive and less accurate than the method disclosed herein. A similar progression has taken place toward zero effects as well.

Although these various means and methods just described (and others not described) are employed to measure, and compensate for parameters that effect Coriolis flow meter sensitivity and zero, the primary and fundamental goal of all of these have been simply to determine the sensitivity and/or zero of the device to fluid flow, and then compensate for any changes therein. What is needed in the art is a way of avoiding the need to measure and compensate. What is needed is improved systems and methods for directly determining sensitivity or zero characteristics, or both, of a Coriolis flow measurement device, thereby allowing overall compensation for any changes in sensitivity or zero characteristics, regardless of source.

SUMMARY OF THE INVENTION

U.S. Pat. No. 5,827,979 deals primarily with apparatus and methods of sensing and signal processing for a Coriolis meter and, more particularly, for distinguishing between mass flow effects and boundary condition effects to produce an output signal that is substantially free from zero shifts due to boundary condition effects. The present invention improves upon U.S. Pat. No. 5,827,979 by basing adjustments to raw flow rate signals on a difference in imaginary components of preliminary sensor signals.

For purposes of the present invention, a "real difference" is a difference between real components of signals produced by two sensors, and a "real sum" is a sum of real components of signals produced by two sensors. The "real components" are the portions of the signals that are substantially in-phase with the drive forces that produce flow conduit vibrations. Likewise, an "imaginary difference" is a difference between imaginary components of signals produced by two sensors, and an "imaginary sum" is a sum of imaginary components of signals produced by two sensors. The "imaginary components" are the portions of the signals that are substantially 90° out-of-phase with the drive forces that produce flow conduit vibrations. Boundary conditions are ambient or fluid conditions that may introduce error in flow rate measurements and include one or more of: fluid temperature, fluid pressure, fluid density or flow conduit stress or strain caused by mounting.

Therefore, the present invention provides a system for, and method of, compensating for a boundary condition effect on a Coriolis meter having (at least) two sensors for generating preliminary signals that are a function of fluid flow through the meter and a Coriolis meter employing the system or the method. In one embodiment, the system includes: (1) signal combination circuitry, couplable to the (at least) two sensors, that develops an imaginary difference signal based on the preliminary signals and (2) boundary effect compensation circuitry, coupled to the signal combination circuitry, that calculates a boundary effect compensation factor based on the imaginary difference signal.

The present invention therefore introduces the broad concept of employing an imaginary difference signal, to determine the degree to which boundary condition effects distort the measurements made by a Coriolis meter. The present invention is founded on the novel recognition that the imaginary difference varies far more as a function of changes in boundary condition than it does as a function of changes in fluid flow rate.

In one embodiment of the present invention, the boundary effect compensation circuitry scales the imaginary difference signal to calculate the boundary effect compensation factor. The imaginary difference signal may be manipulated in any appropriate manner to obtain the desired boundary effect compensation factor. Of course, no scaling, skewing or other manipulation is necessary to the broad scope of the present invention.

In one embodiment of the present invention, the sensors are selected from the group consisting of: (1) strain gages, (2) magnet/coil pairs and (3) accelerometers. Those skilled in the art will recognize, however, that any sensor that measures a characteristic associated with flow conduit movement is within the broad scope of the present invention.

In one embodiment of the present invention, the boundary effect compensation factor is employed to skew a mass flow rate signal derived from the meter. In a related embodiment, the boundary effect compensation factor is employed to adjust a sensitivity of a mass flow rate signal derived from the meter. In an embodiment to be illustrated and described, the boundary effect compensation factor may be involved in real-time compensation and zero determination.

In one embodiment of the present invention, the meter operates in a mode selected from the group consisting of: (1) a bending mode of vibration and (2) a radial mode of vibration. Thus, the present invention is not limited to a particular mode of vibration.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

The following terms are defined for purposes of the present discussion:

Sensitivity—The slope of the output signal level versus mass flow rate relationship of a Coriolis mass flow meter. A typical unit of measurement is output signal level per unit mass flow rate (e.g., milliamps/kg/min).

Zero—The output intercept of the output signal level versus mass flow rate relationship of a Coriolis mass flow meter. A typical unit of measurement is output signal level indicated (e.g., milliamps, or kg/min) when the actual flow rate is zero.

Zero Shift—Any change in the indicated output signal level of the meter not caused by a change in mass flow rate.

Flow Conduit—The device interacting between the fluid to be measured and the sensor or sensors measuring motion, usually a conduit or tube through which or around which fluid is caused to flow, but broadly including any arbitrary surface over, under or through which fluid flows.

Mass Flow Effects (Coriolis Effects)—Effects on the flow conduit due to Coriolis forces acting to alter the amplitude and or phase relationship of the motion at a given location on the flow conduit.

Boundary Conditions (also "BCs")—The physical properties associated with the ends of the active portion of the flow conduit, including properties such as stiffness, mass and damping.

Boundary Condition Effects—Effects on the flow conduit due to changes in the boundary conditions in combination with the driven mode of vibration, including changes such as stiffness, mass and damping. Typically, these effects alter the amplitude or phase relationship of the driven motion at a given location on the flow conduit, that can be interpreted as a mass flow related signal using traditional signal processing techniques.

Driven Mode (also "Dm")—The mode of vibration of the flow conduit that is intentionally excited as necessary to cause Coriolis forces.

Coriolis Mode (also "Cm")—The mode of vibration of the flow conduit that is a response to Coriolis forces.

Boundary Condition Mode (also "BCm")—The mode of vibration of the flow conduit that is a response to the driven mode of vibration in combination with boundary condition effects.

Figure 1:
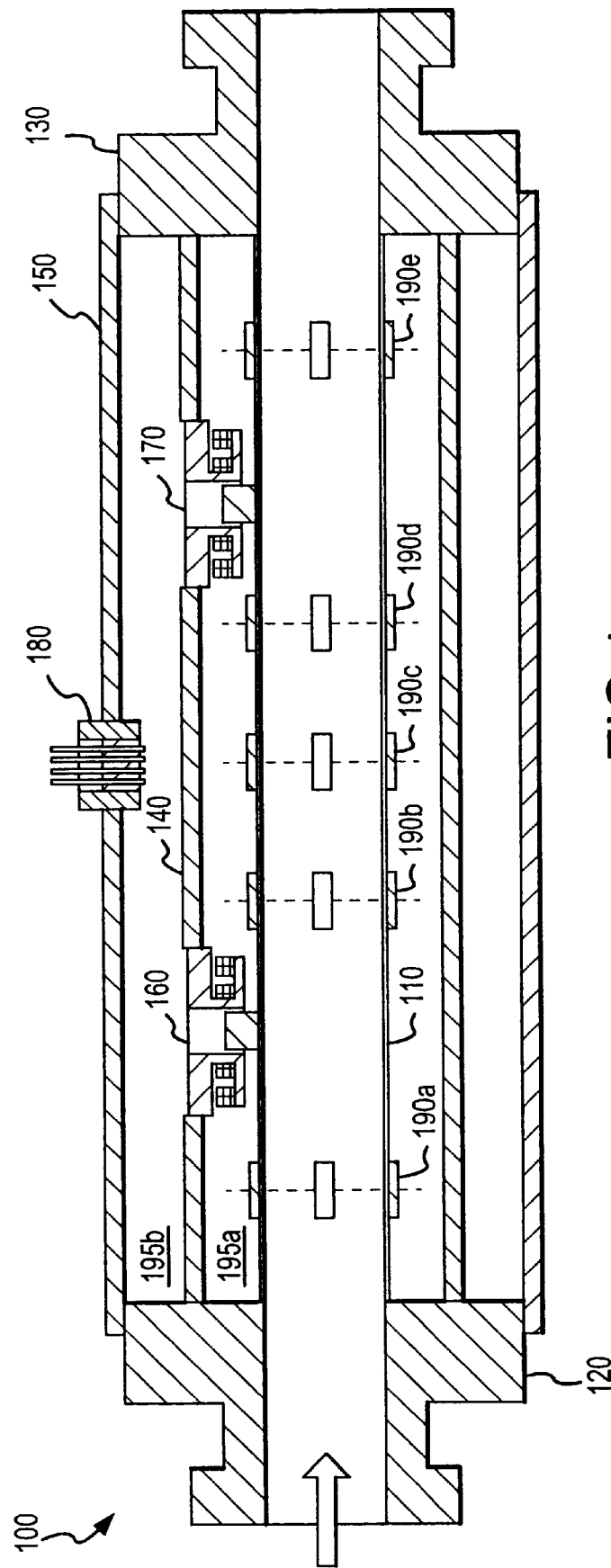
FIG. 1 illustrates a cross sectional view of a Coriolis meter which provides an environment within which a system for compensating for a boundary condition effect that is constructed according to the present invention can operate.
Figure 2A:
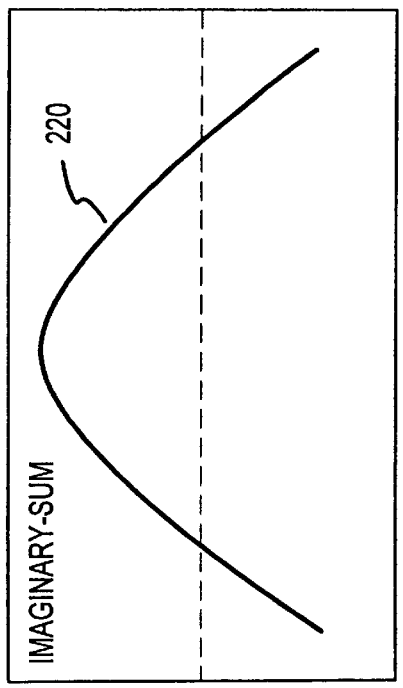
FIG. 2 illustrates a graphical representation of real and imaginary components of sum and difference signals generated by two sensor pairs associated with the meter of FIG. 1.
Figure 2C:
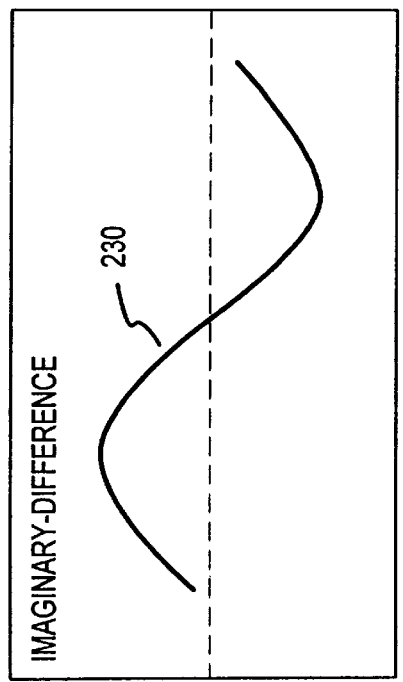
Figure 2B:
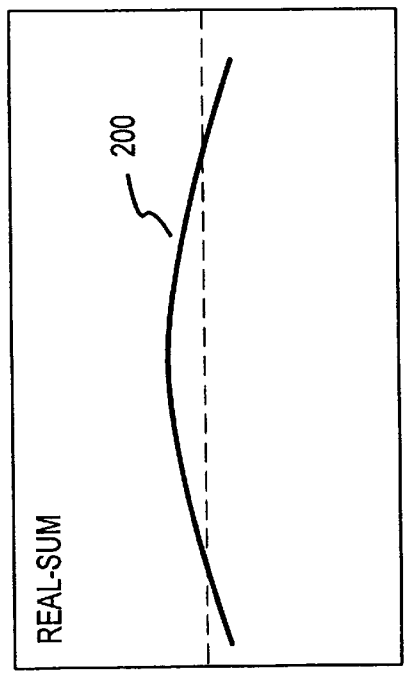
Figure 2D:
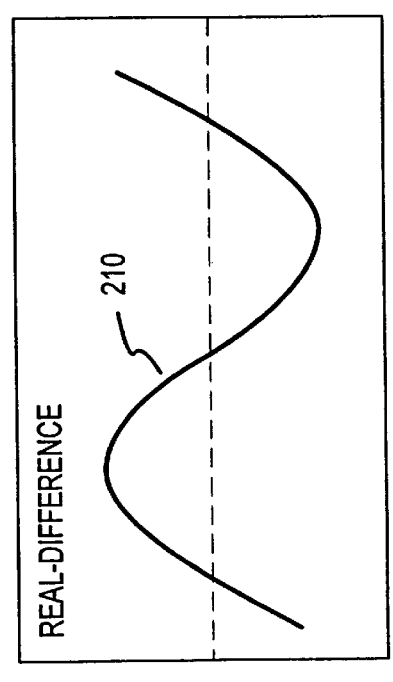

Referring initially to FIG. 1, illustrated is a cross sectional view of a Coriolis meter, generally designated 100, which provides an environment within which a system for compensating for a boundary condition effect that is constructed according to the present invention can operate. A flow conduit 110 is illustrated as being a single straight tubular member made of strong, resilient material, such as stainless steel or titanium. The flow conduit 110 is fixedly attached at both ends to an inlet manifold 120 and an outlet manifold 130 by, for example, welding or brazing. The inlet and outlet manifolds 120, 130 act to terminate the active portion of the flow conduit 110 and to interconnect with the user's pipe fittings (not shown) and with a bracket 140 and a case 150. The bracket 140 may be fixedly attached to both manifolds 120, 130 by welding or brazing, and acts to hold wiring and force drivers 160, 170. The force drivers 160, 170 are illustrated as being magnet/coil pairs, the magnets of which are fixedly attached to the flow conduit 110 and the coils of which are fixedly attached to the bracket 140. The force drivers 160, 170 act to excite and maintain the driven mode of vibration of the flow conduit 110, and to apply reference excitations for sensitivity determination as explained in Ser. No. 08/569,967 included herein by reference.

The bracket 140 is preferably designed to resonate in conjunction with the flow conduit 110 to achieve at least a partial state of "balance" so as to minimize the energy necessary to maintain the driven mode vibration. The resonance of the bracket 140 is not a necessary condition; however, it is normally-accepted design practice to minimize the power necessary to run the device. Since the bracket 140 is not affected by changes in fluid parameters, the state of balance herein achieved is imperfect. The remnant imbalance that normally causes zero drift problems with changing boundary conditions is acceptable in the present invention.

The case 150 acts to protect the elements contained therein, enclosing them (in the illustrated embodiment) in a pressure-tight case capable of maintaining a prescribed amount of pressure or vacuum. Preferably, the annular space inside the case 150 and outside the flow conduit 110 is maintained at a vacuum or filled with an inert gas, such as helium.

A feed-through 180 is fixedly attached to the case 150 by welding or brazing and acts to convey signals (electrical, optical or of other type) between the sensor components and electronic processing circuitry (to be described).

The flow conduit 110 is instrumented with at least two and preferably 5 motion sensors, such as the first, second, third, fourth and fifth motion sensors 190a, 190b, 190c, 190d, 190e that detect some type of measurement parameter, such as displacement, velocity, acceleration, strain or stress. In the preferred embodiment, each of the first, second, third, fourth and fifth motion sensors 190a, 190b, 190c, 190d, 190e comprises four strain gages arranged circumferentially around the flow conduit 110 and interconnected in a bridge circuit configuration to measure the strain of the flow conduit 110 at respective locations.

The first motion sensor 190a is mounted near the inlet manifold end of the flow conduit 110 to measure the strain of the flow conduit 110 at that location. So mounted, the first motion sensor 190a can measure a large portion of boundary condition effects and a smaller portion of Coriolis effects associated with the inlet manifold end of the flow conduit 110.

The second motion sensor 190b is mounted part way between the inlet manifold end of the flow conduit 110 and the center of the flow conduit 110 to measure the strain at that location. So mounted, the second motion sensor 190b can measure a large portion of Coriolis mode effects and a lesser portion of boundary condition effects.

The third motion sensor 190c is mounted near the center of the flow conduit 110 to measure the strain at that location. So mounted, the third motion sensor 190c measures a large portion of the driven mode of vibration and a lesser portion of Coriolis mode effects and boundary condition effects.

Similarly, the fourth motion sensor 190d is mounted part way between the center of the flow conduit 110 and the outlet manifold 130 to measure the strain at that location. So mounted, the motion sensor 190d can measure a large portion of the Coriolis mode effects and a lesser portion of boundary condition effects.

The fifth motion sensor 190e is mounted near the outlet manifold end of the flow conduit 110 to measure the strain at that location. So mounted, the fifth motion sensor 190e can measure a large portion of the boundary condition effects and a smaller portion of Coriolis effects associated with the outlet manifold end of the flow conduit 110.

As stated above, in the illustrated embodiment, the first, second, third, fourth and fifth motion sensors 190a, 190b, 190c, 190d, 190e are illustrated as being 4-leg strain gages arranged in bridge circuits on the preferred embodiment, however alternate embodiments can use alternate numbers of strain gages arranged in different configurations. Similarly, the first, second, third, fourth and fifth motion sensors 190a, 190b, 190c, 190d, 190e can alternately be velocity sensors, such as magnets and coils, accelerometers or displacement sensors. There is an advantage in using strain gages as described, since the bracket 140 may be designed to resonate in conjunction with the flow conduit 110, albeit with imperfect balance. Sensors that are not referenced to the motion of the bracket 140 are thereby advantageous, such as the strain gages described or accelerometers or inertial reference sensors of any type.

A first temperature sensor 195a is mounted in conjunction with the flow conduit 110 to measure its temperature. Similarly, a second temperature sensor 195b is mounted in conjunction with the bracket 140 to measure the temperature of the bracket 140 and the force drivers 160, 170.

Turning now to FIG. 2, illustrated is a graphical representation of typical real and imaginary components of sum and difference signals produced by symmetrically opposite pairs of sensors along the length of flowtube 110. Since in the preferred embodiment, strain sensors are utilized, this figure represents strain values as a function of tube position along the length of flowtube 110. Adding and subtracting signals from symmetrically opposite pairs of motion sensors to form sum and difference components is not necessary to employ the present invention, however it simplifies later signal processing and is therefore used in the preferred embodiment. Symmetrically opposite pairs (190A, 190E) and (190B, 190D) would be combined to form the sum and difference signals herein described.

Signal 200 represents the real component of a sum signal that would be acquired by symmetrically opposite motion sensor pairs along the length of flowtube 110. Signal 210 represents the real component of a difference signal that would be acquired by symmetrically opposite motion sensor pairs along the length of flowtube 110. Signal 220 represents the imaginary component of a sum signal that would be acquired by symmetrically opposite motion sensor pairs along the length of flowtube 110. Signal 230 represents the imaginary component of a difference signal that would be acquired by symmetrically opposite motion sensor pairs along the length of flowtube 110.

In traditional Coriolis meters in which some or all of these signals 200, 210, 220, 230 are derived, the real difference signal 210 is divided by the imaginary sum signal 220, tube frequency and other parameters, to yield a resulting signal (not shown) that is proportional to mass flow rate. However, the resulting signal is subject to variations in proportionality (K-factor) and zero shift subject to changing boundary conditions.

Figure 3:
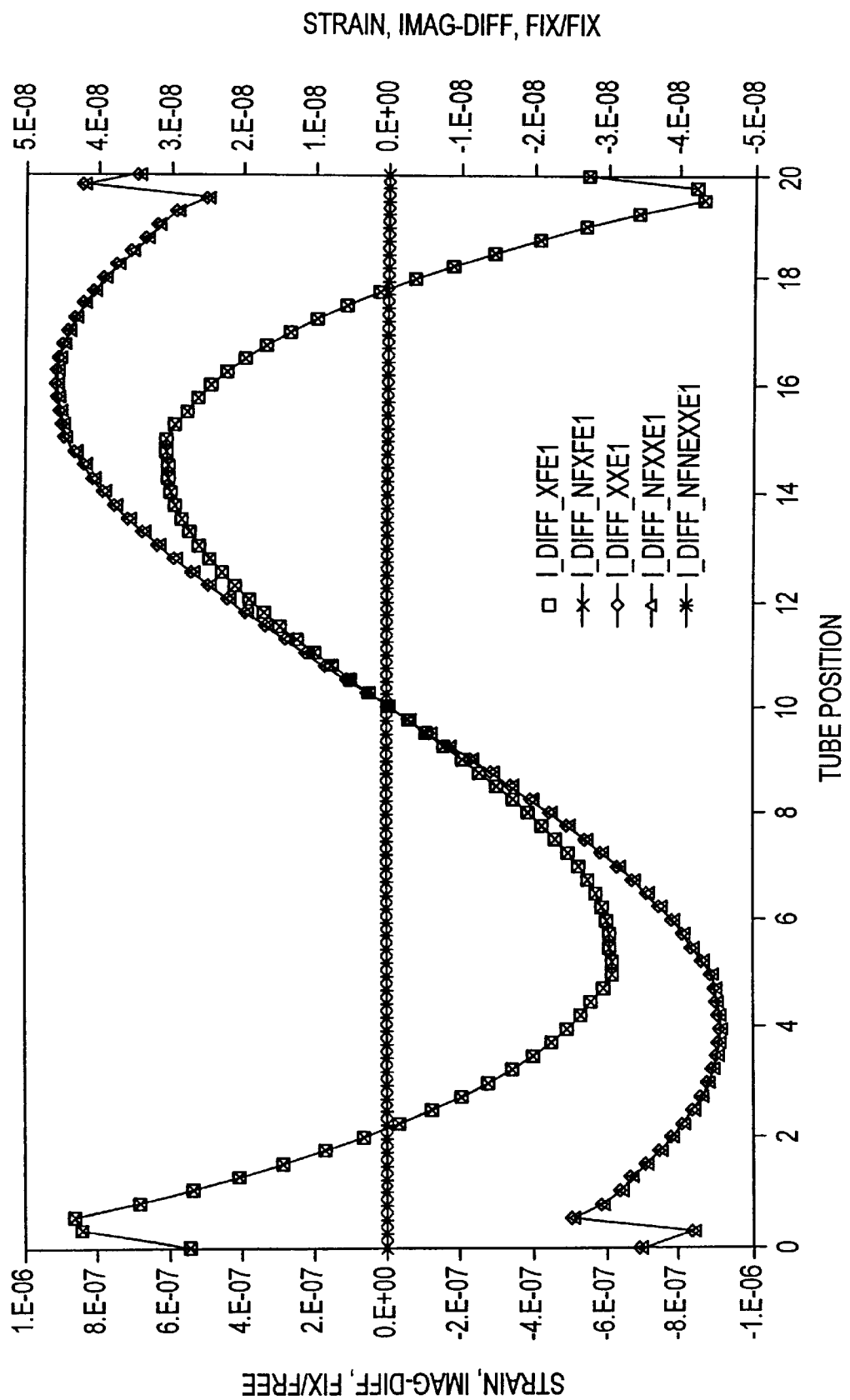
FIG. 3 illustrates a graphical representation of variation of an imaginary difference signal as a function of tube position and changing boundary condition effects.

Turning now to FIG. 3, illustrated is a graphical representation of variation of the imaginary difference signal 230 of FIG. 2 as a function of position along the flowtube 110, where five data sets are presented representing four different boundary conditions.

The present invention is based on the realization that, while the imaginary difference signal 230 varies as a function of boundary condition effects, the variation is substantially proportional to the variation experienced in the imaginary sum signal 220 and substantially independent of mass flowrate. When the imaginary difference signal 230 is divided by the imaginary sum signal 220, the variations substantially cancel one another, yielding a resulting signal (not shown) that is less subject to boundary condition effects.

Finite element analysis (FEA) results show the proportional relationship between boundary condition changes and the magnitude of the imaginary difference signal. FIG. 3 compares five sets of FEA data. While FIG. 3 appears to illustrate only three curves, it should be understood that FIG. 3 in fact illustrates five curves. The two, non-linear curves actually embody four superimposed data sets. The third, linear curve embodies a fifth data set. Each data set represents the imaginary difference strain signal that would be acquired from strain gages positioned along the flow conduit 110 at positions shown on the x-axis (from 0" to 20" along a 20" flow conduit). The different boundary conditions represented are:

1. Fixed/free, with flow, asymmetrical design (represented by a data set 310);
2. Fixed/free, no flow, asymmetrical design (represented by a data set 320);
3. Fixed/fixed, with flow, asymmetrical design (represented by a data set 330);
4. Fixed/fixed, no flow, asymmetrical design (represented by a data set 340); and
5. Fixed/fixed, no flow, perfect symmetry (represented by a data set 350).

The data sets 310, 320, 330, 340, 350 on the graph show that each imaginary difference signal is greatly affected by different boundary conditions and, at most, insignificantly by mass flow rate, since each data set with flow is the same as that same boundary condition data set without flow. Further, the data set 350 represents no flow and perfect boundary conditions and therefore shows virtually no signal at all.

Since the imaginary difference signal is substantially proportional to boundary condition changes, and not substantially proportional to flow rate, and since boundary condition changes cause errors on the real difference signals (causing errors on the resulting calculated mass flow rate), a scaled version of this imaginary difference signal can be applied to the mass flow rate calculation algorithm to compensate errors in both sensitivity and zero offset.

There are many different methods of signal processing employed in Coriolis mass flow meters, and the present invention is not limited to any particular signal processing method. The fact that the imaginary difference signal is substantially proportional to boundary condition changes and not to flow rate makes it useful for compensation of sensitivity and zero errors caused by such changes, regardless of the particular method of signal processing or equations used. In the preferred embodiment, five motion sensors of the strain gage type are used to determine strain value at their locations, and those values are then used in a later described curve fitting routine to determine the true mass flow rate independent of errors due to boundary condition changes. Simpler signal processing methods using only two motion sensors and simple equations are also described and may have adequate accuracy in many situation. This simpler method is first described.

The following equation may therefore be used in the illustrated embodiment to calculate mass flow rate from the signals derived from the Coriolis meter. Compensation is included for boundary condition changes using scaled versions of the imaginary difference signals (Idif.). The scale factors C1, C2 and C3 are determined by calibration. For purposes of the equation, two sensors of the strain gage type are assumed, for example, motion sensors 190A and 190E of FIG. 1.

$$\text{Mdot} = [\text{Rdifel} - (C1 * \text{Idifel})] / [(\text{Isumel} * (C2 * \text{SREF}) * \Omega)] \quad (1)$$

Where:
Mdot=mass flow rate
SREF=reference sensitivity=ref_strain /ref_force
R=real component (component in-phase with drive forces)
I=imaginary component (component 90° out-of-phase with drive forces)
sum=summation of (inlet+outlet) symmetrical positions
dif=difference of (inlet−outlet) symmetrical positions
e1=no reference excitation
e2=with reference excitation
nf=no flow
Ω=driven frequency
C1=constant of proportionality, boundary conditions vs. zero shift
C2=constant of proportionality, SREF vs. SCOR
C3=constant of proportionality, boundary conditions vs. sensitivity shift Using the simpler two motion sensor method, and looking at FIG. 4, motion sensors 190a and 190e, are strain gages arranged in four-leg bridge circuits that are conditioned by components 410, and 450 respectively. The output signals from the components 410, and 450 are converted to digital values by a converter component 460. Component 470 then demodulates the strain signals into their real and imaginary components using demodulation references from component 480. The real and imaginary components are then passed to solver 510 for summing and differencing, thereby creating the real difference, the imaginary sum, and the imaginary difference signals necessary to implement equations 1 & 2 above. Solver 510 then implements said equations 1 & 2 to determine mass flow rate.

Figure 4:
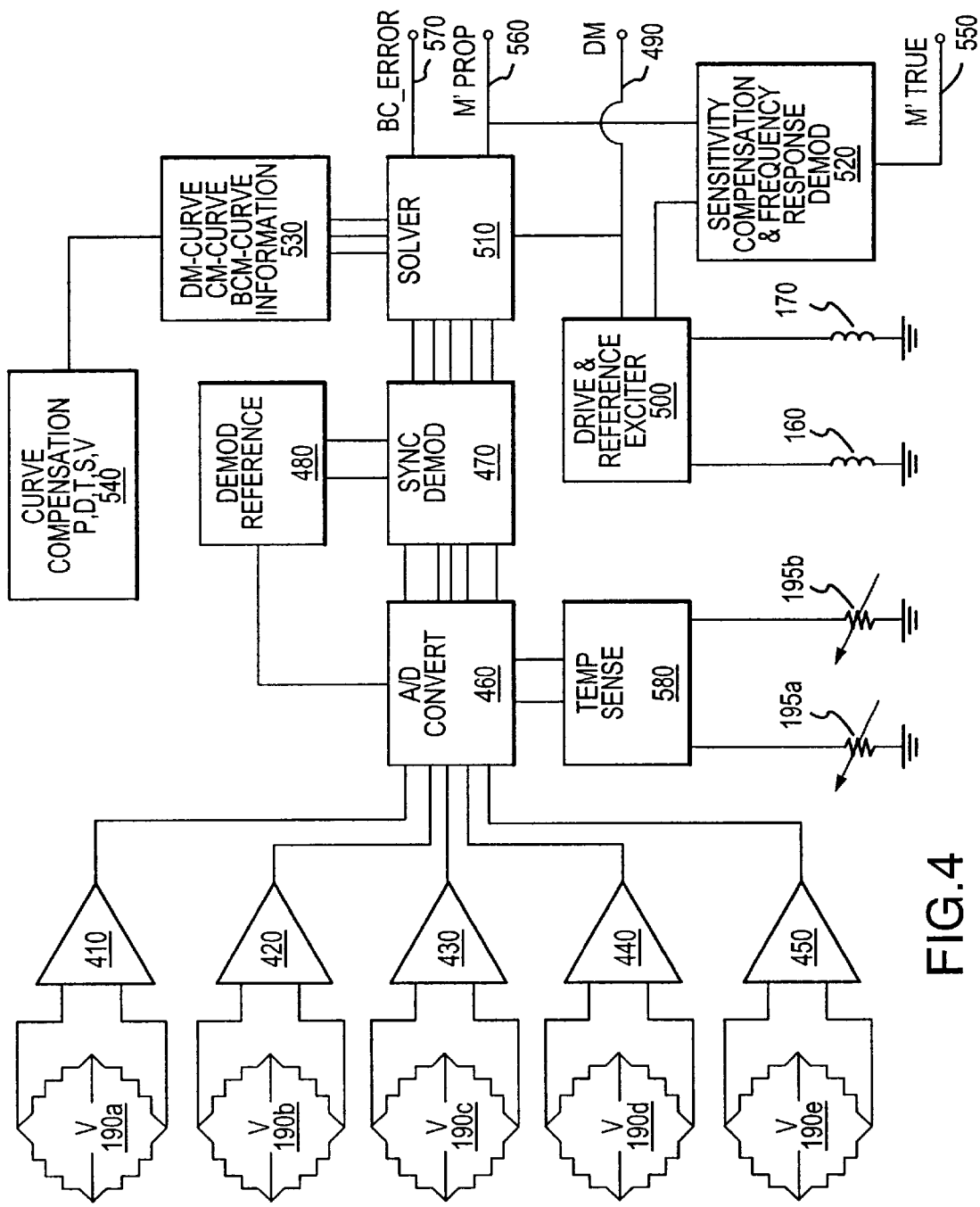
FIG. 4 illustrates a block diagram of signal processing circuitry containing a system for compensating for a boundary condition effect constructed according to the principles of the present invention.

Additional motion sensors along the length of flowtube 110 will yield additional data and resolution of the flowtube motion and will result in higher accuracy. Therefore the preferred embodiment employs five motion sensors. Turning now to FIG. 4, illustrated is a block diagram of signal processing circuitry containing a system for compensating for a boundary condition effect constructed according to the principles of the present invention. In keeping with FIG. 1, the sensors 190a, 190b, 190c, 190d, 190e are strain gages arranged in four-leg bridge circuits that are conditioned by components 410, 420, 430, 440, 450 respectively. The output signals from the components 410, 420, 430, 440, 450 are converted to digital values by a converter component 460. It is often advantageous to reference the measurements taken from the flow conduit 110 relative to the motion at a particular location that is least affected by other disturbances, such as Coriolis effects or boundary condition effects. In the preferred embodiment in which the driven mode of vibration is a first order bending mode, the center location of the third sensor 190c is the best location for a reference. Therefore, the motion information from sensors 190a, 190b, 190c, 190d, 190e is synchronously demodulated in the circuit component 470, using the motion of the sensor 190c as a reference. The motion of the sensor 190c is conveyed to the component 480 that transforms that motion into a reference signal (or a plurality of reference signals) for the synchronous demodulator 470. The exact type of transformation depends on the type of motion sensors used and the desired phase relationship of the reference signal. By selecting a 90° phase transformation for a reference signal in the component 480, the synchronous demodulator component 470 extracts imaginary strain amplitude values containing both driven mode vibration information and boundary condition effect information. The synchronous demodulator 470 preferably uses a plurality of demodulators, a second one of which then demodulates the Coriolis mode information from the signals from sensors 190a, 190b, 190c, 190d, 190e using a second reference signal from the component 480 that is in phase with (real) drive forces. This drive mode information Dm 490 is then used as feedback to the drive and reference exciter component 500. A temperature sense component 580 conditions temperature signals from temperature sensors 195a, 195b for use in temperature compensation within the signal processing circuitry.

A solver 510 performs the function of summing and differencing symmetrically opposite pairs of motion sensor signals (190a, 190e) and (190b, 190d) thereby creating the aforementioned real difference, imaginary sum, and imaginary difference signals necessary to extract true mass flowrate information independent of boundary conditions. Solver 510 also performs the function of curve-fitting the data and thereby solving for any or all of the magnitudes of (a) drive mode component, (b) Coriolis mode component and (c) boundary condition mode component. For this example, strain amplitude data are taken during a vibration cycle of the flow conduit 110.

With these preliminary signals determined, the solver 510 fits the data to the anticipated function curves of the driven mode curve Dm (imaginary sum), the Coriolis mode curve Cm (real difference) and the boundary condition mode Bcm (imaginary difference). Using traditional curve fitting techniques, the magnitude of each of these three components (Dm, Cm, Bcm) can be accurately established. These components (Dm, Cm, Bcm) then correspond to the imaginary sum, the real difference, and the imaginary difference, components respectively. Once established, the true mass flowrate can then be determined by substituting these values into equations (1) and (2) above, in solver 510.

Many curve-fitting methods are known and well documented and available for use to determine the magnitude of one or more characterized components (e.g., the Cm component in Equation (4), above) that may be present in a data set. These methods include simultaneous solutions of non linear equations, curve-fitting routines, and application of particular algorithms to the data to separate the Coriolis mode component from the boundary condition component, or other error components as hereinafter described.

The highest accuracy can be attained by accurately characterizing the curves of all the possible components that can occur in the data (e.g., the Coriolis mode component, the drive mode component, the boundary condition mode component, and any other known component). With all the possible components known and characterized, numerical solutions can accurately determine the relative magnitudes of each component that may be present in a given data set. Therefore in the preferred embodiment, this is the method used and all known components are characterized and submitted to the solver for solution.

In lieu of characterizing all the possible components, as a minimum the Coriolis mode component can be characterized, and submitted to a curve-fitting routine for determination of the "best fit" of the Coriolis mode shape to a given data set. The closeness of the fit to the data can be determined therefrom usually in the form of the "root of the mean square deviation" or "IR" value as is commonly used in curve-fitting terminology. This R value can also be employed as a compensation value to the Coriolis mode component value since it represents the magnitude of the deviation of the data from the anticipated characteristic shape of the Coriolis mode shape. The use of the R value is not the preferred method however, since both random noise in the data, and boundary condition mode in the data can alter the R value. By accurate characterization of all the anticipated components, the numerical solution accurately discerns between the similar shapes of the Coriolis mode component and the boundary condition mode component.

Therefore, the preferred method is that of curve-fitting the data to the anticipated characteristic curves to determine (as a minimum) the magnitude of the Coriolis mode component. The preferred method of curve-fitting involves the use of the Gauss-Newton method as described in "C-Curve Fitting and Modeling For Scientists And Engineers" by Dr. Jens Georg Reich, McGraw Hill, ISBN 0-07-051761-4. This method involves the use of the anticipated characteristic curves involved. These functions are the mathematical representations of the expected Driven mode motion, the Coriolis mode motion and the boundary condition mode motion. If strain gages are used for motion sensors (as in the case of the preferred embodiment), then mathematical representations of the strain curves may be used for the anticipated functions. Finally, other components 520, 530, 540 provide signals 550, 560, 570 of use in determining mass flow through the flow conduit 110.

Although the present invention has been described in detail, those skilled in the art should understand that they can make various changes, substitutions and alterations herein without departing from the spirit and scope of the invention in its broadest form.

What is claimed is:

1. A system for compensating for a boundary condition effect on a Coriolis meter having at least two sensors for generating preliminary signals that are a function of fluid flow through said meter, comprising:

signal combination circuitry, coupled to said two sensors, that develops an imaginary difference signal based on said preliminary signals; and boundary effect compensation circuitry, coupled to said signal combination circuitry, that calculates a boundary effect compensation factor based on said imaginary difference signal.

2. The system as recited in claim 1 wherein said boundary effect compensation circuitry scales said imaginary difference signal to calculate said boundary effect compensation factor.

3. The system as recited in claim 1 wherein said two sensors are selected from the group consisting of:

strain gages, magnet/coil pairs, and accelerometers.

4. The system as recited in claim 1 wherein said boundary effect compensation factor is employed to skew a mass flow rate signal derived from said meter.

5. The system as recited in claim 1 wherein said boundary effect compensation factor is employed to adjust a sensitivity of a mass flow rate signal derived from said meter.

6. The system as recited in claim 1 wherein said meter operates in a mode selected from the group consisting of:

a bending mode of vibration, and a radial mode of vibration.

7. A method of compensating for a boundary condition effect on a Coriolis meter having at least two sensors for generating preliminary signals that are a function of fluid flow through said meter, comprising:

developing an imaginary difference signal based on said preliminary signals; and calculating a boundary effect compensation factor based on said imaginary difference signal.

8. The method as recited in claim 7 wherein said calculating comprises scaling said imaginary difference signal to calculate said boundary effect compensation factor.

9. The method as recited in claim 7 wherein said two sensors are selected from the group consisting of:

strain gages, magnet/coil pairs, and accelerometers.

10. The method as recited in claim 7 further comprising employing said boundary effect compensation factor to skew a mass flow rate signal derived from said meter.

11. The method as recited in claim 7 further comprising employing said boundary effect compensation factor to adjust a sensitivity of a mass flow rate signal derived from said meter.

12. The method as recited in claim 7 further comprising operating said meter in a mode selected from the group consisting of:

a bending mode of vibration, and a radial mode of vibration.

13. A Coriolis meter, comprising:

a flow conduit;

a driver, coupled to said flow conduit, that causes said flow conduit to vibrate in a given mode;

two sensors, coupled to said flow conduit, that generate preliminary signals that are a function of fluid flow through said flow conduit, said preliminary signals subject to a boundary condition effect;

signal combination circuitry, coupled to said two sensors, that develops an imaginary difference signal based on said preliminary signals; and boundary effect compensation circuitry, coupled to said signal combination circuitry, that calculates a boundary effect compensation factor based on said imaginary difference signal and employs said boundary effect compensation factor to reduce said boundary condition effect.

14. The meter as recited in claim 13 wherein said boundary effect compensation circuitry scales said imaginary difference signal to calculate said boundary effect compensation factor.

15. The meter as recited in claim 13 wherein said signal combination circuitry further develops a real sum signal based on said preliminary signals and said boundary effect compensation circuitry calculates said boundary effect compensation factor based on both said real sum signal and said imaginary difference signal.

16. The meter as recited in claim 13 wherein said two sensors are selected from the group consisting of:

strain gages, magnet/coil pairs, and accelerometers.

17. The meter as recited in claim 13 wherein said boundary effect compensation circuitry employs said boundary effect compensation factor to skew a mass flow rate signal derived from said meter.

18. The meter as recited in claim 13 wherein said boundary effect compensation circuitry employs said boundary effect compensation factor to adjust a sensitivity of a mass flow rate signal derived from said meter.

19. The meter as recited in claim 13 wherein said given mode is selected from the group consisting of:

a bending mode, and a radial mode.

* * * * *